(12) United States Patent
Hofman

(10) Patent No.: US 9,330,339 B2
(45) Date of Patent: May 3, 2016

(54) SYSTEM AND METHOD FOR DETECTING CARGO CONTAINER SEALS

(71) Applicant: Hi-Tech Solutions Ltd., Yokneam (IL)

(72) Inventor: Yoram Hofman, Kefar Bialik (IL)

(73) Assignee: Hi-Tech Solutions Ltd., Yokneam (IL)

( * ) Notice: Subject to any disclaimer, the term of this patent is extended or adjusted under 35 U.S.C. 154(b) by 0 days.

(21) Appl. No.: 14/382,990

(22) PCT Filed: Jun. 11, 2013

(86) PCT No.: PCT/IB2013/001223
§ 371 (c)(1),
(2) Date: Sep. 4, 2014

(87) PCT Pub. No.: WO2013/186625
PCT Pub. Date: Dec. 19, 2013

(65) Prior Publication Data
US 2015/0063634 A1 Mar. 5, 2015

Related U.S. Application Data

(60) Provisional application No. 61/658,381, filed on Jun. 11, 2012.

(51) Int. Cl.
*G06K 9/00* (2006.01)
*G06K 9/62* (2006.01)
*G06K 9/32* (2006.01)

(52) U.S. Cl.
CPC .......... *G06K 9/6202* (2013.01); *G06K 9/00684* (2013.01); *G06K 9/00697* (2013.01); *G06K 9/3241* (2013.01); *G06K 9/62* (2013.01)

(58) Field of Classification Search
None
See application file for complete search history.

(56) References Cited

U.S. PATENT DOCUMENTS

3,790,198 A * 2/1974 Hagen ............................ 292/317
6,067,374 A * 5/2000 Fan et al. ...................... 382/135
(Continued)

FOREIGN PATENT DOCUMENTS

EP 2491849 A1 8/2012
JP 2006036392 A 2/2006
(Continued)

OTHER PUBLICATIONS

International Search Report and Written Opinion dated Nov. 5, 2013 for PCT/IB2013/001223.
(Continued)

*Primary Examiner* — Sumati Lefkowitz
*Assistant Examiner* — Carol Wang
(74) *Attorney, Agent, or Firm* — Lowenstein Sandler LLP; Ariel Reinitz

(57) ABSTRACT

Systems and methods are disclosed for detecting container seals. In one implementation, a processing device receives one or more images and processes the one or more images to identify one or more areas of interest within at least one of the one or more images, the one or more areas of interest including one or more areas of the one or more images within which a container seal is relatively likely to be present. The processing device compares the one or more identified areas of interest with one or more templates, each of the one or more templates being associated with one or more respective seal types. The processing device identifies, based on the comparison, one or more matches between the one or more identified areas and the one or more templates, and provides, based on the identification of the one or more matches, an identification of the container seal.

16 Claims, 7 Drawing Sheets

(56) References Cited

U.S. PATENT DOCUMENTS

| | | | |
|---|---|---|---|
| 6,527,312 B1* | 3/2003 | Jackovino et al. | 292/282 |
| 2006/0244954 A1* | 11/2006 | Daley et al. | 356/237.1 |
| 2006/0255953 A1* | 11/2006 | Lyon et al. | 340/572.8 |
| 2008/0221445 A1* | 9/2008 | Rollins et al. | 600/428 |
| 2010/0018941 A1* | 1/2010 | Kerr et al. | 215/250 |
| 2010/0226533 A1 | 9/2010 | Bharath et al. | |
| 2012/0070035 A1 | 3/2012 | Koo et al. | |

FOREIGN PATENT DOCUMENTS

| | | | |
|---|---|---|---|
| WO | 2007122221 A1 | 11/2007 | |
| WO | 2009052854 A1 | 4/2009 | |
| WO | 2012042986 A1 | 4/2012 | |

OTHER PUBLICATIONS

Response to Written Opinion of The ISA and Demand, dated Apr. 11, 2014.
International Preliminary Report on Patentability, dated Jun. 11, 2014.
D.T. Pham et al., "Smart Inspection Systems, Chapter 1: Automated Visual Inspection and Artificial Intelligence", Feb. 2, 2003, 34 pages.
Demant Christian, "Industrial Image Processing—Visual Quality Control", Feb. 2, 2009, 1 page.
Jun Zhang et al., "Object Recognition Based On Template Correlation In Remote Sensing Image", Jul. 12, 2004, 4 pages.
European Search Report dated Mar. 24, 2016 for EU Application No. 13804298, International PCT Application No. PCT/IB2013/001223, 12 pages.

* cited by examiner

US 9,330,339 B2

SYSTEM AND METHOD FOR DETECTING CARGO CONTAINER SEALS

CROSS-REFERENCE TO RELATED APPLICATIONS

This application is a U.S. National Stage application of International Application No. PCT/IB2013/01223, filed Jun. 11, 2013, which claims the benefit of U.S. patent application Ser. No. 61/658,381, filed Jun. 18, 2012, each of which is hereby incorporated by reference in its respective entirety.

TECHNICAL FIELD

Aspects and implementations of the present disclosure relate to data processing, and more specifically, to detecting cargo container seals.

BACKGROUND

Various regulatory bodies require that all maritime cargo containers (e.g., those destined for a particular country or port) be secured with an ISO compliant seal. Such seals may be required to withstand a number of ISO-standard tests (e.g., tensile, bending, shearing and impact tests).

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives one or more images. The processing device processes the one or more images to identify one or more areas of interest within at least one of the one or more images, the one or more areas of interest including one or more areas of the one or more images within which a container seal is relatively likely to be present. The processing device compares the one or more identified areas of interest with one or more templates, each of the one or more templates being associated with one or more respective seal types. The processing device identifies, based on the comparison, one or more matches between the one or more identified areas and the one or more templates. The processing device provides, based on the identification of the one or more matches, an identification of the container seal.

In another aspect, a processing device receives one or more images. The processing device processes the one or more images to identify one or more areas within at least one of the one or more images within which a container seal is relatively likely to be present. The processing device processes the one or more identified areas to determine an identification of the container seal. The processing device provides, based on the processing of the one or more identified areas, the identification of the container seal.

In another aspect, a processing device receives one or more images. The processing device processes the one or more images to identify one or more areas within at least one of the one or more images within which a container seal is relatively likely to be present. The processing device processes the one or more identified areas to determine an identification of the container seal. The processing device processes the one or more images to determine a context of the container seal. The processing device determines, based on the identification of the container seal and the context of the container seal, an effectiveness of the container seal. The processing device provides, based on the identifying, an identification of the container seal and an identification of the effectiveness of the container seal.

In another aspect, a processing device receives one or more images. The processing device processes the one or more images to determine an identification of a container seal. The processing device provides the identification of the container seal.

In another aspect, a processing device receives one or more images. The processing device processes the one or more images to determine an identification of a container seal. The processing device processes the one or more images to determine a context of the container seal. The processing device determines, based on the identification of the container seal and the context of the container seal, an effectiveness of the container seal. The processing device provides an identification of the container seal and an identification of the effectiveness of the container seal.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Various regulatory bodies require that all maritime cargo containers (e.g., those destined for a particular country, port, etc., such as the United States) be secured with an ISO compliant seal. Examples of such standards include ISO 17712: 2010—"Freight containers—Mechanical seals." Such seals are required to withstand a number of ISO-standard tests (e.g., tensile, bending, shearing and impact tests).

The seals referenced herein can include mechanical seals which can, for example indicate and/or enable determination(s) as to whether a container such as a freight container (that is secured with the seal) (and/or the contents thereof) has potentially been tampered with. Such seals can, for example, indicate whether an unauthorized entry into the container has been performed through its doors.

Figure 1:
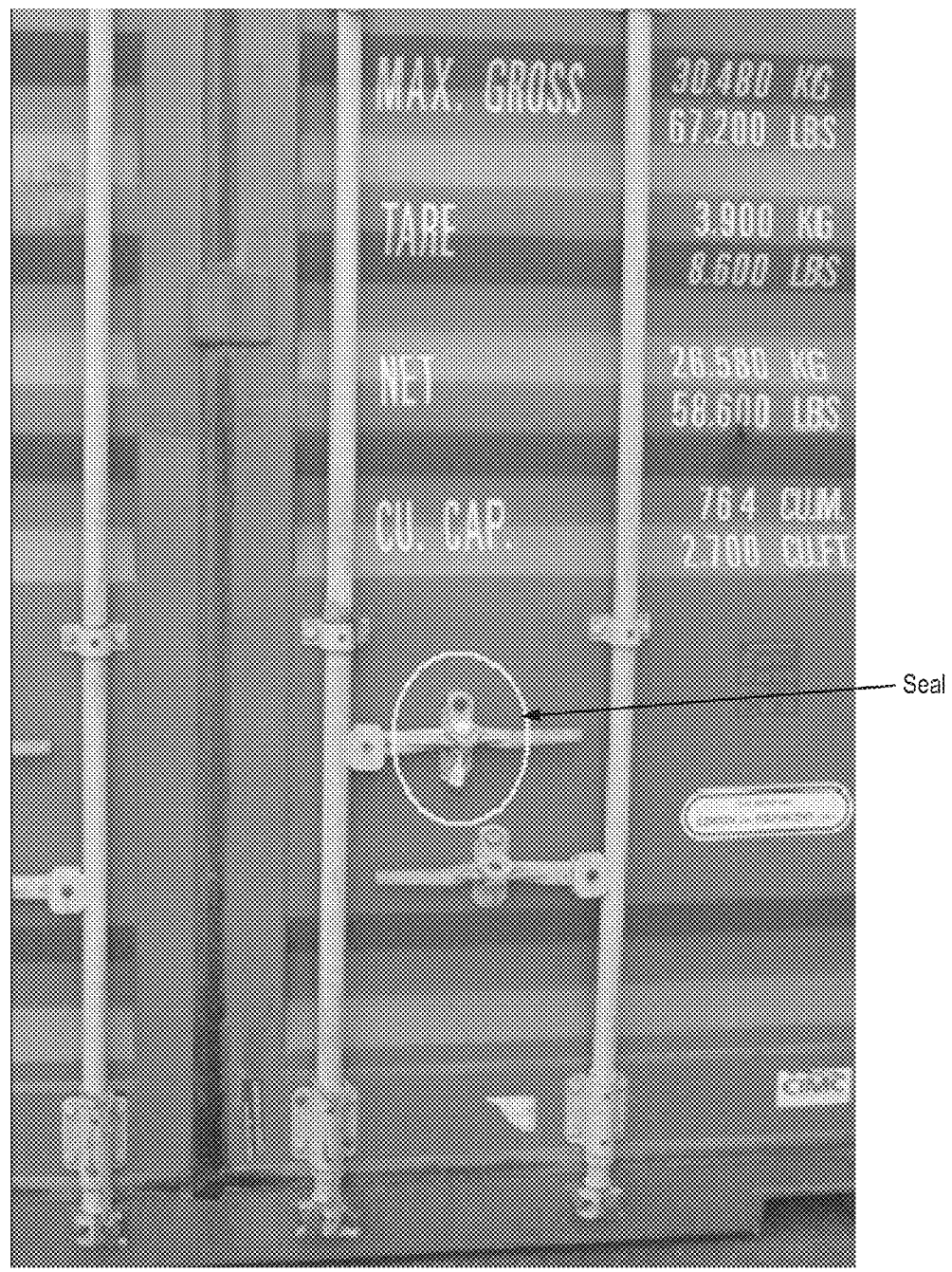
FIG. 1 depicts an exemplary location of a seal, in accordance with one implementation of the present disclosure.
Figure 2:
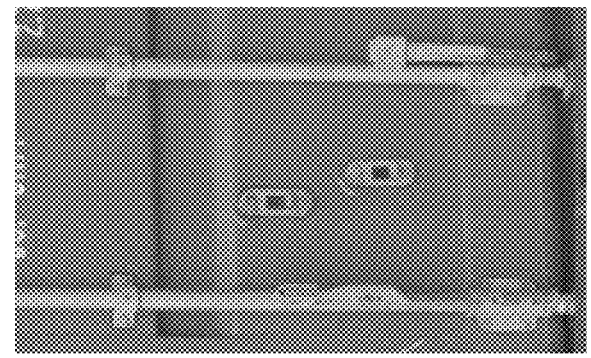
FIG. 2 depicts various seals (and their locations), as well as an instance where no seal is present, in accordance with one implementation of the present disclosure.
Figure 2:
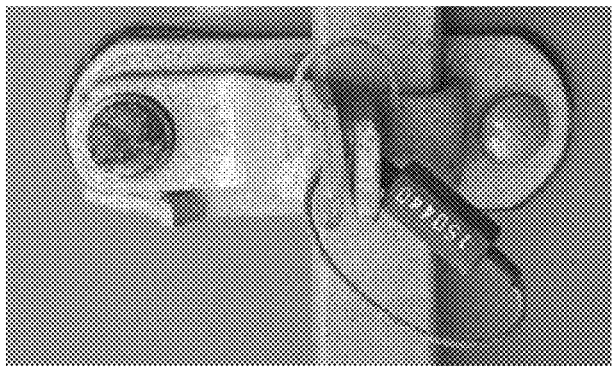
Figure 2:
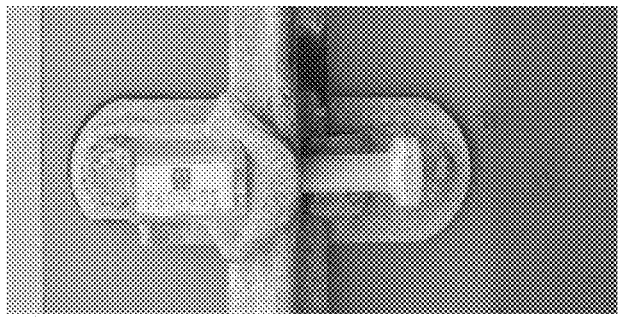
Figure 2:
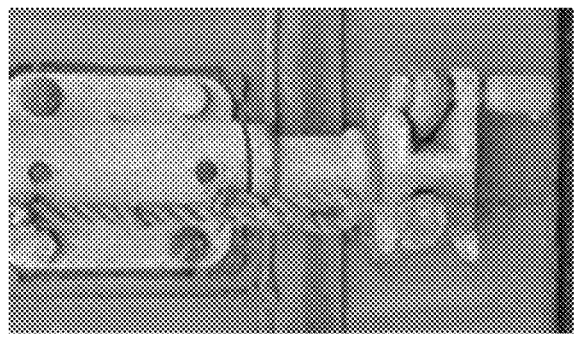

Types of such seals include, but are not limited to: bolt seals (the majority used in cargo containers), cable seals and bar seals. Such seals can, for example, be located on the right panel of a container door (since it closes on/over the left panel). The common places where they are located are on one of the two right locking bars, or on the low side of the hinge. FIG. 1 depicts an exemplary location of one such seal, while FIG. 2 depicts various seals (and their locations), as well as an instance where no seal is present ('open handle').

In various scenarios, individuals and/or entities, such as Customers of a marine shipping companies, can request, dictate, and/or otherwise require that a seal (or seals) be inspected, such as at the gates of the marine and intermodal terminals. Moreover, in some scenarios and/or terminals the number printed on the seal is also to be examined and/or compared to corresponding records (e.g., shipping records). While such inspections can be performed manually, any number of inefficiencies, inaccuracies, etc., are attendant with such an approach. Accordingly, it can be advantageous to provide technologies (such as those described herein) that can identify and/or otherwise determine the presence and/or state of a seal. Such technologies can also increase safety conditions in relation to such cargo containers (as human inspectors need not be present in areas where the containers are being transported or otherwise manipulated).

In various implementations, the technologies described herein can be employed by, for example, capturing and/or receiving an image (or any other such comparable content, e.g., video, etc.) of a seal, archiving it, and subsequently processing such an image to determine whether a seal is (or is not) present in the image, such as in response (reaction) to an issue/event (e.g., a report/complaint of theft), which may be identified at a later date (e.g., days or weeks later).

In other implementations, the presence and/or state of such seals can be determined concurrent with the processing/transport of the container. In such implementations, a missing (or defective, broken, etc.) seal can be identified, for example, while a container is processed within the premises (e.g., of a shipping/cargo yard), and the re-check (e.g., a subsequent determinations) of the state of the seal can also be performed, for example, concurrent with the handling of the container. The technologies described herein can also be configured such that personnel (e.g., a clerk in the gate control room, crane control room, etc.) can view the captured/identified seal image and further decisions can be made based on the presented image(s).

Figure 3:
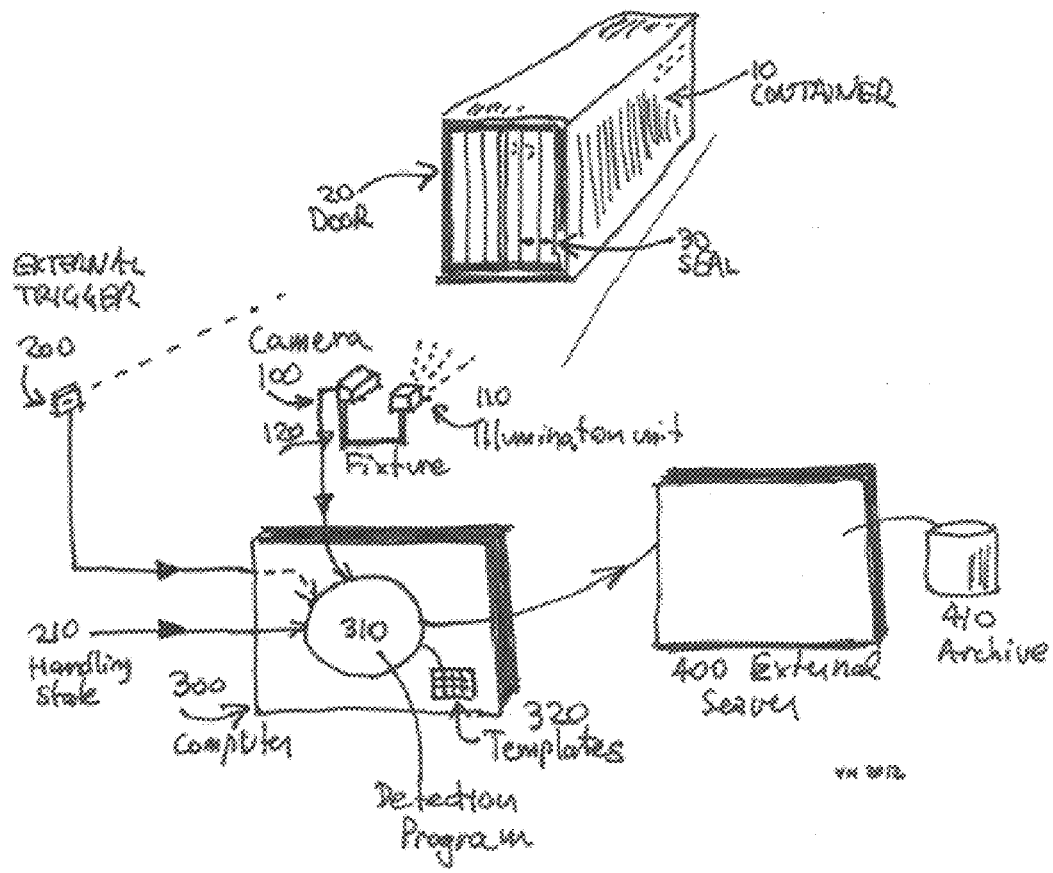
FIG. 3 depicts an illustrative system architecture, in accordance with one implementation of the present disclosure.

FIG. 3 depicts an illustrative system architecture and arrangement, in accordance with one implementation of the present disclosure. The system can include and/or be configured in relation to one or more of the components/elements described herein, and each of such components can include one or more components. Moreover, such components can be combined together or separated in further components, according to a particular implementation. It should be noted that in some implementations, various components described herein may run on separate machines. Moreover, some operations of certain of the components are described in more detail below with respect to FIGS. 4-6.

Container 10 (e.g., a cargo container), can have a door 20 (e.g., at the rear of the container). Such a door 20 can be locked or otherwise secured by one or more seals 30, such as those described herein and depicted in FIGS. 1 and 2.

The system can also include one or more cameras 100 (e.g., a megapixel camera, such as a color camera) capable of capturing images and/or video. It should be understood that while FIG. 3 depicts a single camera, any number of additional cameras (e.g., positioned at different angles) can also be employed. For example, in certain implementations one camera can be configured to capture images of the entirety of door 20 and/or container 10, while another camera can be configured to capture images of seal 30. Moreover, in certain implementations, employing multiple cameras can enable three-dimensional (3D) analysis of a desired area, such as in a manner known to those of ordinary skill in the art.

In certain implementations, camera(s) 100 can be configured to capture images (such as those of the seal) at a resolution of 8 pixels (or more) per centimeter (though it should be understood that other resolutions can also be employed). Such resolutions can ensure that the seal can be detected within the image. In other implementations, lower resolution cameras can be employed, such as by configuring such cameras to capture multiple images, and by further utilizing one or more superresolution (SR) techniques to enhance the resolution of such images, such as is known to those of ordinary skill in the art. In doing so, overview cameras (such as those that are employed in shipping/cargo yards) can be utilized, such as in addition to high(er) resolution camera(s) that may be dedicated to seal recognition.

Moreover, in certain implementations it can be advantageous to capture the referenced image(s) of the seal such that the seal can be fully perceived/identified within the image taken of the rear of the container. Furthermore, it can be advantageous for the system to be configured such that the seal can be identified within the captured image(s) across most, if not all, of the containers passing through, with the door facing the camera.

In certain implementations, the manner in which the image(s) are to be captured can also depend on the type of cargo station in relation to which such seal detection is being performed: e.g., whether the subject container (in relation to which the seal detection is being performed) is positioned in a stationary or dynamic manner. In scenarios where the container is positioned in a stationary manner (e.g., in the case of quay crane operations on a platform, as is known to those of ordinary skill in the art), it can be preferable the referenced image(s) while the container is not moving. In doing so, the timing of the capture of the images can be, to a degree, relaxed, and the field of view of the camera(s) can be narrowed/focused, thereby increasing the resolution of the seal within the image. For example, in certain implementations a seal can be identified/detected within a of view of about 120 cm by 100 cm. In certain implementations, a 1 megapixel camera can suffice for such a field of view (e.g., using the 8 pixels-per-cm rule).

In other implementations, the capture of the referenced image(s) can be performed in a dynamic manner. For example, in such image(s) can be captured by one or more cameras oriented on/in relation to a crane. When, for example, the container is transferred by the spreader of the crane, the field of view of the camera can be increased and/or the capture timing can be configured accordingly. By way of further example, in implementations involving a gate system (e.g., where a truck hauls the container on a chassis and is moving relative to the camera(s)), the field of view of the camera can be increased. Doing so can ensure that the seal position within the captured image is unlikely to be missed by the camera. An example field of view for such implementations can be 200 cm×200 cm, which can entail use of a relatively higher resolution camera (e.g., a 3 megapixel camera can suffice for such a field of view, based on the 8 pixels-per-cm rule) in order to maintain a preferable resolution.

The referenced field of view can also be dictated based on one or more additional requirements of the system. For example, in a scenario where, in addition to seal detection, container marking detection/recognition is also to be achieved (such as at the same station), a single camera can be shared for both objectives, however the field of view of such a camera can preferably be expanded, such as in order to cover the rear of the container. Being that the field of view can account for both low and high container sizes and/or chassis, the field of view can reach 400 cm×300 cm. In such cases it can be preferable for the camera resolution to be at least 8 megapixel.

In certain implementations, with respect to the images in which the seal is to be detected, the contrast of the seal, such as in relation to its background (e.g., door or handle) can be 20% (or higher) of the full intensity range (which is, for example, 50 grey levels out of 256 in a 8-bit image).

It should be understood that the various technologies described herein can utilize any image type, such as color and/or black & white, though, in many circumstances color images can be preferable (e.g., in order to increase the contrast of the seal in relation to the handle and/or the door). Moreover, in certain implementations, an infrared (IR) image can be used (being that the seal and the handle/door are, in many cases, made of different materials, and thus an IR image is likely to produce a high contrast image).

An illumination unit 110 (e.g., an LED array) can be employed, such as in scenarios involving night operation. Fixture 120 can be, for example, a bracket that holds/positions camera 100 and/or illumination unit 110.

In certain implementations, such as those in which nighttime/dark operation is desired, illumination unit 110 (for example, a solid state LED light source) can be utilized to ensure that the container door area is properly illuminated (such as when the referenced image(s) are captured). Such illumination can ensure that the seal present within the referenced image(s) has a relatively higher contrast than the background (e.g., the door of the container and/or the handles), such as during the night and twilight times. Moreover, being that the presence of the color of the seal within the image(s) can improve the ability to detect the presence of the seal, in certain implementations it can be preferable to utilize a white illumination. It should be understood that illumination unit 110 can be adjusted and/or calibrated in order to avoid providing too much illumination (resulting in the "washing out" of details within the image and/or the contrast of the seal to the door and handles).

The system can also include one or more triggers 200, which can be, detect or otherwise perceive when a trigger event occurs (in relation to which one or more images are to be capture). Examples of trigger 200 include, but are not limited to a laser trigger or IR sensor.

Handling state 210, as shown in FIG. 3, can correspond to external information, such as the state of a crane that is transporting a container, a state of another system, etc. As described herein, one or more trigger event(s) can be identified, determined, and/or otherwise derived based on the monitoring of such external information. Examples and/or sources of such information include, but are not limited to: the crane controller (PLC) reports or an internal state in the cargo handling system.

Computer 300 (which can be, for example, a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein) can be configured to control various aspects of the system, as described herein. A detection program/application 310 (e.g., an application, module, and/or set of instructions) can be executed in conjunction with computer 300, and can be operative to, for example, process and/or otherwise analyze one or more captured images, such as in order to identify the presence of a seal therein, such as is describe herein. One or more templates 320 can be stored at and/or in conjunction with computer 300. For example, such templates can be hosted by one or more storage devices, such as main memory, magnetic or optical storage based disks, tapes or hard drives, NAS, SAN, and so forth. In some implementations, such templates can be a stored in a network-attached file server, while in other implementations such templates can be stored in some other type of persistent storage such as an object-oriented database, a relational database, and so forth, that may be hosted by computer 300 or one or more different machines coupled to computer 300 via a network such as the internet (not shown), while in yet other implementations such templates can be stored in a database that is hosted by another entity and made accessible to computer 300. Such templates can include one or more images, such as cropped images, seals. Such templates can be utilized in order to match (or otherwise identify one or more similarities between) an input/received/captured image to one or more of the template images. In certain implementations, templates 320 can be used to train a program to identify one or more seals, etc., using machine learning techniques, as are known to those of ordinary skill in the art.

In certain implementations, computer 300 can be coupled or otherwise connected (e.g., through a network such as the internet) to one or more external devices such as external server 400. For example, having identified the presence of the seal in a captured image, such an identification can be reported to server 400. Moreover, in certain implementations, in addition to the image and/or the determination, a confidence rating associated with such a determination and/or alerts (e.g., flagging a particular image for manual review) can be reported by computer 300 and stored in server 400, which can also include archive 410 (e.g., database that maintains the results of such determinations—for example, that a particular container was/was not secured with a seal at a particular time/place).

In certain implementations, the system and/or components described in relation to and/or depicted in FIG. 3 can be configure to operate as follows: Container 10 can arrive or otherwise pass at a detection station (e.g., at a shipping/cargo yard), such as with door 20 (secured with seal 30) facing camera 100. While the area of seal 30 is within the field of view of the camera 100, computer 300 can receive a trigger event from external trigger 200 (e.g., a laser sensor). Alternatively and/or in addition, computer 300, executing, for example, detection program 310, can determine and/or otherwise derive appropriate trigger timing, such as based on the handling state 210 it receives from the container handling equipment. Illumination unit 110 can illuminates the area of the seal 30, such as substantially concurrent with the capture of one or more images by camera 100, in order to ensure that the seal will be sufficiently visible within the captured image. The captured image(s) can then be provided to and/or received by computer 310, such as through a network. It should be noted that, in certain implementations, one or more of the images can be captured and/or provided or by a frame grabber or by a camera interface device.

One or more of the captured and/or received images can be processed and/or otherwise analyzed. In doing so, the presence (or absence) of one or more seal(s) can be detected or otherwise determined, such as in the manner described herein. In certain implementations, upon identifying one or more seals (e.g., those of one or more known seal types), detection program 310 can report to external server 400 regarding the detected seal, and a confidence measure (e.g., of the detection) can be calculated. Detection program (310) can also attach or otherwise provide an overview image, which, in certain implementations, can include a rectangle (or any other such designator) around the identified seal, and/or a cropped image, such as of the area within the referenced rectangle. Such results can be archived in the database 410, and can serve as verification/proof of the presence of the seal 30 on the observed container 10, such as in scenarios where the presence of the seal and/or the security of the container is later called into question, requires confirmation/verification, etc.

Figure 4:
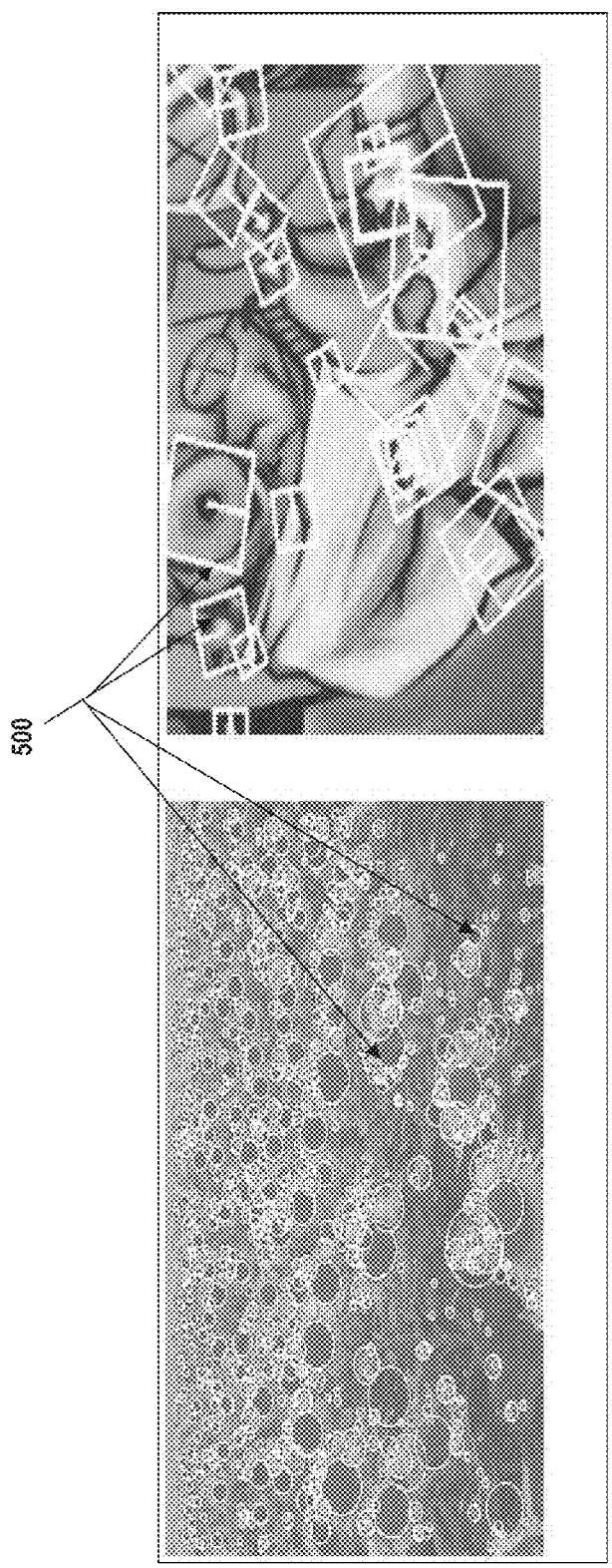
FIG. 4 depicts examples of images with interest points, in accordance with one implementation of the present disclosure.
Figure 5:
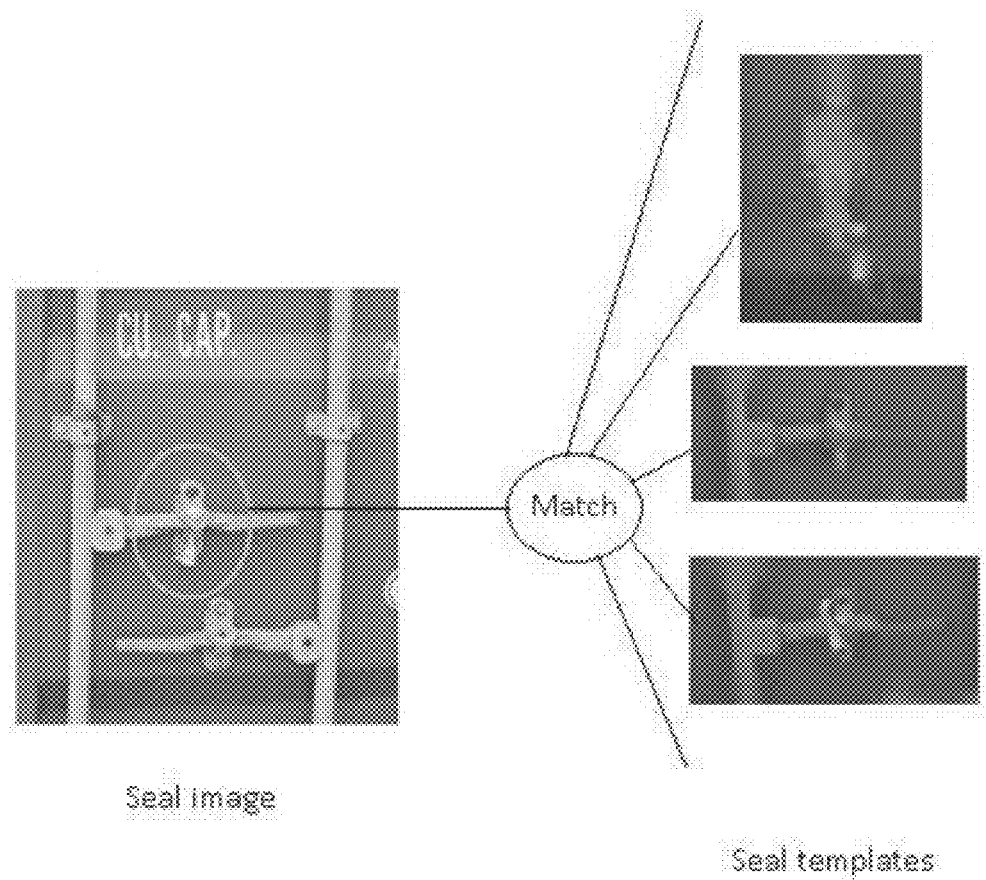
FIG. 5 depicts matching various templates to a captured image in accordance with one implementation of the present disclosure.

It should also be noted that, in certain implementations, various operations referenced herein are operative to detect, identify, and/or classify objects (such as seals) based on the object's signature. The signature can be extracted using interest points (IP), also known as keypoints or feature-points. In a typical object there can be, for example, between a dozen to several hundred IPs, depending on the resolution and/or the number of hot spots. Examples of images with such interest points 500 are shown in FIG. 4. The referenced points can be located in intensity peaks and corners.

Various techniques employed with respect to interest points (IP) can be implemented in conjunction with one or more elements and/or components including: a detector (that can be configured to find IPs in a object), a descriptor (that can be configured to describe the IP as a set of numbers), and a template match component (which can be configured to compare the descriptor to templates, such as of known object classes). The IP detector can pass on the region of interest and produce multiple potential IPs. Potentially non stable or non-distinctive IPs can be filtered out and a description of the remaining IPs can be generated.

The referenced interest points can be, for example, locations within an image that have one or more of the following characteristics, such as that their position is relatively well defined and stable ('stable' refers to the fact that when changing the capture conditions, such as lighting, viewing angle, and/or distance (size), by a limited amount, the referenced point can still be identified as an interest point), and/or that the description of the particular interest point is distinctive, e.g., in that it is substantially different from the description of the other IPs.

Various techniques for IP detectors and descriptors are known to those of ordinary skill in the art. Examples include:

Harris corner detector (Harris, C., Stephens, M.: A combined corner and edge detector; Proceedings of the Alvey Vision Conference. (1988) 147-151), Modified Harris methods (such as: Mikolajczyk, K., Schmid, C.: Indexing based on scale invariant interest points. In: ICCV. Volume 1. (2001) 525-531), SIFT (Lowe, D.: Object recognition from local scale-invariant features. In: ICCV. (1999)), and SURF (Bay H., Tuytelaars T., and Van Gool L.: SURF: Speeded Up Robust Features. ECCV 2006), each of which is incorporated by referenced herein in their respective entireties.

One implementation of the technologies described herein uses the SURF detector and descriptor, although other techniques can be similarly used for implementing the detection and descriptor. The SURF descriptor for each IP is preferably a vector of 64 (or 128) numbers, which are computed from 4 summation responses within 4×4 squares in the neighborhood of the IP.

As described herein, in certain implementations of the technologies described herein can involve matching a given captured object image (e.g., of an unknown, cropped image which may or may not depict a seal), such as to a set of previously stored templates of seals.

In certain implementations, during a training phase, a number of images (e.g., several dozen, hundreds, etc.), such as of different containers, can be captured and/or received, such as in relation to different containers. Then, each seal type can be marked, its name can be identified or entered (e.g., into database), and the image inside the referenced region can be cropped and/or stored as a template in a library. It should be understood that multiple (e.g., hundreds) different images of the seal type can be collected, such that the library/set of templates can have a degree of variation with respect to different orientations/exposures of the same seal type.

Moreover, in certain implementations, one or more of the referenced templates can be analyzed (such as in the manner described herein) and their Interest Points (IPs) can be detected. For each IP, a numerical descriptor can be computed and/or stored in the template database. In doing so, the image templates can be converted to numeric vectors. A typical template for a seal (and its background), using high resolution cameras, can be 100×80 pixels, and can contain about 100 IPs, where each IP, in accordance with SURF, can be a vector of 64 (or 128) values. It should be understood that this example is not limiting and other embodiments may exist for obtaining the templates, including, for example, obtaining them from an external source, such as a central database.

In a testing phase, the captured image can be processed/analyzed and its IPs can be generated. Then, the referenced numerical database of the templates can be scanned and one or more attempts can be made to match the image IPs to one or more templates IPs. If a match (e.g., a significant match) is identified, the system can determine the classification, such as to one of the seal types. Based on the quality of the match, a confidence measure can be calculated. If, for example a high quality match is found, the system can report the seal type and its confidence.

It should be noted that, in various implementations interest points are extracted in grey level images (as they rely on the intensity gradient information), however, color can supplement the information on the observed object in order to further increase the degree of confidence of the classification to a certain class of objects.

In order to utilize the color information of the object, the various technologies described herein can utilize color histograms, such as in order to better match the object to one of the known classes. Color histograms are invariant to translation and rotation about the viewing axis, and change only slowly under change of angle of view, change in scale, and occlusion. Furthermore, the color histograms can be calibrated and/or normalized in order to reduce the effects of the environment and the camera.

The color histogram utilized in the technologies described herein is utilized in order to increase the confidence of various detections. Based on the shape of the color histogram, it can be verified that, for example, a color bolt or cable seal is present, such as based on a determination that a second color is found within an image. The color histogram can also be used while performing a retry on the detection, such as by enhancing the image based on the color segmentation.

Moreover, in certain implementations, the technologies described herein can utilize a staged detection process. In doing so, the handle (i.e., of the container door) can be detected, such as using one of the techniques described herein, and the seal can then be detected, such as in the area of the handle. In certain implementations, the identification of the handle and/or the seal can be achieved using various machine learning techniques (such as the Viola-Jones method and/or heuristic methods, as are known to those of ordinary skill in the art). Other such staged detection implementations are also contemplated, such as staged detection based on the state, status, location, etc., of the seal. For example, having identified a particular seal type, a further determination can be performed to identify the location of the seal within the larger context of the container (e.g. the position of the seal along the back side of the container).

It should be noted that various aspects and features referenced herein are also describe in International (PCT) Patent Application No. PCT/IL2011/000634, filed Aug. 4, 2011, entitled "METHOD AND SYSTEM FOR COLLECTING INFORMATION RELATING TO IDENTITY PARAMETERS OF A VEHICLE," which is hereby incorporated by reference herein in its entirety.

Among the benefits provided by the present system and method are: Improved performance, being that the matching process has a relatively low error rate together with a high detection rate. Moreover, the IP-matching technologies described herein can enable the referenced classification(s) to be performed/achieved in a manner that is relatively unaffected by changes in the position of the object (e.g., the seal) (based on, tilt, view angle, etc.), the environment (illumination), and/or the scale of the object (small or large). The technologies described herein can thus be employed in a wide and dynamic range of different parameters. Moreover, in cases where some of the objects are not properly identified, a new template can be prepared/generated, such as from such an exception image, and subsequent image(s) can handle such an exception. Additionally, the technologies described herein can be employed in 'real time,' in light of the processing efficiencies and optimizations that are attendant with them.

In certain implementations, the technologies described herein can include one or more methods of seal detection based on classification of each of the seal type(s) identified within one or more images. Such a classification can be achieved, for example, based on a processing of such image(s) in relation to templates for each of the seal types. In doing so, the referenced templates (e.g., of each seal type) can be scanned in one or more attempts to match such templates to the referenced captured image(s) (and/or vice versa), such as based on the determined interest-points, as illustrated, for example, in FIG. 5. The matched objects can then be selected, such as based on the best match. Upon identifying a match with sufficient confidence (e.g., within a defined threshold), that object (i.e., the object within the captured image, such as a seal) can be identified as a candidate for the detected seal.

Figure 6:
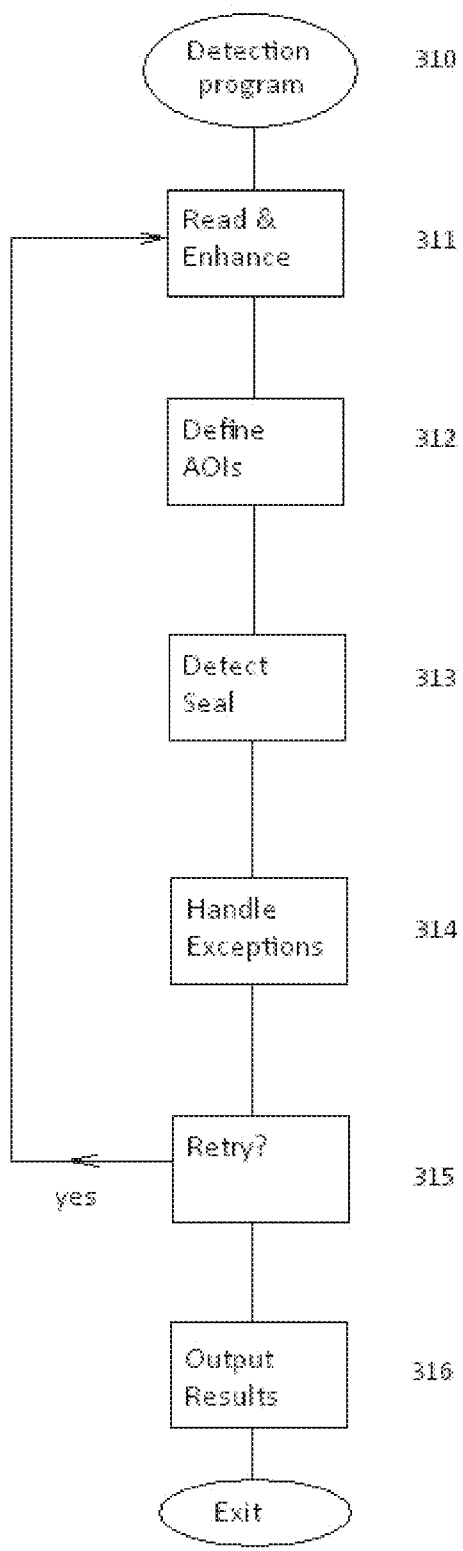
FIG. 6 depicts a flow diagram of aspects of a method for detecting cargo seals.

FIG. 6 depicts a flow diagram of aspects of a method for seal detection. The method is performed by processing logic that may comprise hardware (circuitry, dedicated logic, etc.), software (such as is run on a general purpose computer system or a dedicated machine), or a combination of both. In one implementation, the method is performed by computer 300 of FIG. 3, such as via execution of detection program 310, while in some other implementations, one or more blocks of FIG. 6 may be performed by another machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At 311, one or more image(s) can be captured, read and/or enhanced. For example, in certain implementations the image can be read, and can be enhanced such as by contrast stretching, as is known to those of ordinary skill in the art. The referenced enhancement can, for example, increase the contrast of the handles and the seal, as described herein. Moreover, in certain implementations, a histogram can be computed, such as across the captured image(s). Based on the computed histogram information, one or more low and/or high values can be determined. Furthermore, the image(s) can be modified (e.g., based on the histogram low/high values), such as by recalculating the pixel value, as is known to those of ordinary skill in the art. In one aspect, block 311 is performed by detection program 310.

At 312, one or more areas of interest (AOIs) can be defined. In doing so, one or more areas of the handles (e.g., the handles of the container door, as referenced herein) can be marked. Moreover, in doing so, the places/areas within which the seal is to be identified or looked for can be focused or otherwise limited. In one aspect, block 312 is performed by detection program 310.

In certain implementations, a copy of the input image(s) can be created. A filter can be applied across the copy of the image, such as in order to enhance the horizontal and vertical lines. Such lines (i.e., on the copy of the image) can be detected (e.g., using Hough transform or an equivalent or similar line detection technique, as are known to those of ordinary skill in the art).

Moreover, in certain implementations, the areas of the handles (i.e., the handles of the container door) can be identified and/or otherwise defined. In addition, with respect to areas of the image(s) in which handles are identified, one or more location(s) of the hooks (i.e., the hooks that operate in conjunction with the handles, container door, etc.) can be searched for/identified. In doing so, one or more places and/or areas within the image that are probable/likely for a seal to be present can be marked and/or saved.

At 313, seal detection can be performed. In doing so, one or more attempts can be made to match one or more templates of seals to the areas of handles (as identified/defined at 312). With respect to one or more of the marked area(s) (such as those marked at 312), the image can be cropped (e.g., to the marked area). Moreover, in certain implementations, each marked/cropped area/image can be compared with one or more templates (e.g., a set of templates). Upon identifying a match, such as between a marked/cropped area of an image and one or more templates, the pair can be saved together with a computed match probability (reflecting, for example, a confidence/accuracy measure of the match). In one aspect, block 313 is performed by detection program 310.

In certain implementations, upon identifying multiple matched pairs (e.g., identifying matches between a marked/cropped image and several different templates) an aggregate/overall score can be calculated. Such a score can be computed based on and/or as a reflection of the number of matched pairs for each seal class/type.

It should be noted that in scenarios where no seal class is matched (e.g., if not seal class is matched a score higher than a defined threshold), it can be determined that no seal is present in the image. Alternatively, in scenarios where a seal is detected (such as is described herein), the seal class of the identified seal can be selected/identified and a confidence metric can be computed. Having done so, the cropped image (e.g., of the identified/classified seal) can be saved.

At 314, one or more exceptions can be handled. In doing so, various aspects of the quality of the detection can be examined/analyzed, and various outstanding issues can be resolved. For example, in scenarios where more than one seal is detected (e.g., within the captured image(s)), the computed confidence value/metric of the result can be lowered, such as by a fixed or relative value, and the area with the highest score can be selected. Moreover, in scenarios where more than one seal class is determined, the confidence of the result(s) can be lowered by a fixed or relative value, and the seal class with the highest score can be selected. In one aspect, block 314 is performed by detection program 310.

Moreover, in certain implementations, upon determining that no door details have been identified in the captured image(s) (e.g., if no door handles are identified), the entire field of view can be processed or otherwise checked, even irrespective of the identified areas of interest. If a seal is subsequently found/identified (e.g., elsewhere within the captured image), the referenced confidence metric can be lowered, such as by a fixed or relative value. Additionally, if no seal is subsequently identified, the result output can be set as "inverse door direction".

At 315, in a scenario where no seal is detected (e.g., within the captured image(s)), one or more of operations 311-314 can be retried/repeated, such as using a higher sensitivity (with a matching threshold). In scenarios where a seal is subsequently detected during (i.e., during such repetitions), the referenced confidence value/metric can be reduced by a fixed and/or relative value/amount. In one aspect, block 315 is performed by detection program 310.

At 316, one or more determinations can be made and/or one or more results can be output. For example, based on the match results (such as those computed at 313), the status of the presence of a seal can be determined, such as based on an aggregate of the various confidence metrics previously computed. The cropped image area (i.e., the area of the captured image containing the identified seal) can also be selected. For example, the status of the detection (e.g., whether a seal was identified and/or the type/classification/state of the identified seal) can be reported (e.g., via an electronic notification, message, etc.), together with a computed confidence measure and/or an overview and cropped images of the seal as captured. In one aspect, block 316 is performed by detection program 310.

At this juncture, it should be noted that while several implementations described herein incorporate various template matching techniques and/or approaches (such as in order to identify/classify a container seal), in other implementations one or more alternative and/or other techniques can be employed. For example, in lieu of employing template matching, one or more techniques such as optical recognition techniques (as are known to those of ordinary skill in the art) can be employed, such as in order to identify, detect, and/or classify a container seal present within one or more images, and the various technologies described herein can be modified accordingly. It should be further noted that such implementations are also within the scope of the present disclosure.

It should also be understood that in certain implementations, various further aspects and characteristics of the seal (or seals) can be identified, detected, and/or determined. For example, in certain implementations the state or status of a seal can be identified/determined. For example, it can be appreciated that in addition to determining a presence of a seal, one or more aspects of the state of the seal (e.g., whether the seal is locked, unlocked, tampered with, etc.) can also be determined. It can be further appreciated that in determining a state or status of a seal, various further determinations can be made and various steps can be taken in response. For example the system can be configured such that, having determined that a seal has potentially been tampered with, additional images can be captured (e.g., in order to capture further aspects or areas of the container which, on account of the potentially tampered seal, may have been compromised) and/or the container can be flagged by the system as potentially requiring further inspection. Additionally, by analyzing the state or status of a seal, a degree of security/integrity (or lack thereof) can be determined with regard to the cargo of a particular container or containers.

Moreover, it should also be appreciated that various types of seals (such as those depicted in FIG. 2) are preferably oriented in specific locations on a container. For example, one type of seal may be preferably oriented in one area of a container (e.g., on a handle), while another type of seal may be configured to be fastened in another area of the door (e.g. on the bottom of the door). Additionally, certain types of seals may also require further specific configurations (e.g., positions of other container elements, such as doors, handles, etc.) in order to ensure that such seals are effective in maintaining their seal and preserving the integrity of the contents of the container. Accordingly, in addition to determining the presence of and/or characteristics regarding a particular seal, in certain implementations the location and/or context of a seal can also be captured and processed, and can also, for example, be correlated with the recognition of the seal itself. In doing so, an analysis of both the properties of the seal itself, as well as the context of the seal within the entire container can be performed, thereby further enhancing the reliability of the computed determinations.

For example, as referenced above, one type of seal may only be effective (or may be more effective) if positioned near the middle of the back of a container, while another type of seal may only be effective if positioned at the bottom of the back of a container, on a particular side of a container (e.g., on the right-hand side), and/or in proximity or relation to a particular element of the container. Accordingly, such properties can be identified and/or determined (such as in a manner known to those of ordinary skill in the art and/or described herein), and further correlated with identification of a seal (or seals) associated with such a container. In correlating the type of seal with the location (and/or other properties/aspects that reflect the context within which the seal is present) it can be appreciated that further verifications and validations can be performed which can determine whether the presence of a particular seal (such as a seal of a particular type) is actually indicative of the integrity of the contents of a container. For example, if a particular seal type is configured to be fastened to the middle of the back of a container, if such a seal is determined to be present at the bottom or side of the back of the container, the seal may not be effective to seal the contents of the container, and such a scenario can be flagged as being insecure or compromised, and/or requiring further investigation/inspection, as referenced above.

At this juncture, it should be noted that while much of the present disclosure is described with respect to detecting cargo seals, in other implementations such operations/instructions can be employed in practically any other setting and/or scenario.

Figure 7:
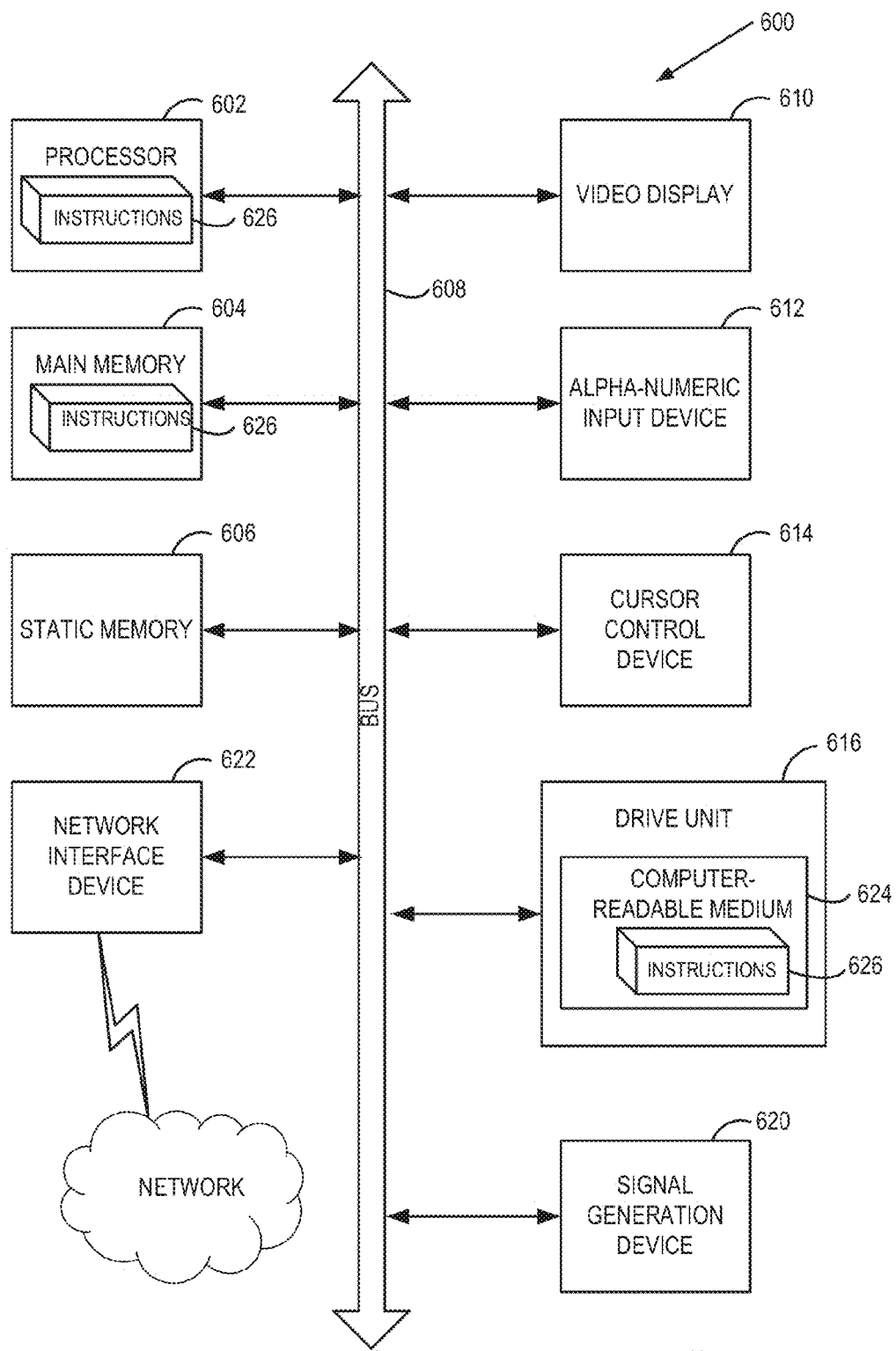
FIG. 7 depicts a block diagram of an illustrative computer system operating in accordance with aspects and implementations of the present disclosure.

FIG. 7 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet.

The machine may operate in the capacity of a server machine in client-server network environment. The machine may be a personal computer (PC), a server, a network router, switch or bridge, mobile device (e.g., a smartphone) or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., detection program 310, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "providing," "determining," "identifying," "associating," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, digital images (e.g., video clips, audio clips, textual documents, web pages, etc.). The scope of the disclosure should, therefore, be determined with reference to the appended claims, along with the full scope of equivalents to which such claims are entitled.

What is claimed is:

1. A system comprising:
   a memory; and
   a processing device, operatively coupled to the memory, to:
   receive one or more images;
   process the one or more images to identify one or more hooks and one or more handles of a container within the one or more images;
   based on an identification of the one or more hooks and the one or more handles within the one or more images, mark one or more areas of the one or more images as being likely to contain a container seal;
   process one or more templates associated with a seal type of the container seal to (a) detect one or more interest points within the one or more templates and (b) compute a numerical descriptor for each of the one or more interest points within the one or more templates;
   convert the one or more templates into one or more numeric vectors; process the one or more areas of the one or more images to generate one or more interest points of the one or more images;
   match, based on the one or more numeric vectors, the one or more interest points of the one or more images with the one or more interest points of one or more templates to determine an identification of the container seal, the identification of the container seal comprising the seal type of the container seal;
   process the one or more areas of the one or more images to determine an identification of the container seal, the identification of the container seal comprising a seal type of the container seal;
   process the one or more images to determine a context of the container seal and a location of the container seal in relation to the container;
   correlate the seal type of the container seal with (a) the context of the container seal and (b) the location of the container seal in relation to the container;
   determine, based on the correlation of the seal type of the container seal with the context of the container seal and the location of the container seal in relation to the container, an effectiveness of the container seal; and
   provide, the identification of the container seal and an identification of the effectiveness of the container seal.

2. The system of claim 1, wherein to process the one or more images is to crop the one or more images down to an area within which the container seal is relatively likely to be present.

3. The system of claim 1, wherein to the processing device is further to process the one or more images to determine a relative likelihood that the container seal is present within one or more areas of interest.

4. The system of claim 1, wherein the processing device is further to compute a quantity of templates associated with a particular seal type that are comparable to the one or more areas of the one or more images.

5. The system of claim 1, wherein the processing device is further to compute a quantity of areas of the one or more images within which the container seal is relatively likely to be present.

6. The system of claim 1, wherein to provide the identification of the container seal the processing device is further to provide an identification of a presence of the container seal.

7. The system of claim 1, wherein to provide the identification of the container seal the processing device is further to provide an identification of the type of the container seal.

8. The system of claim 1, wherein to provide the identification of the container seal the processing device is further to provide an identification of a state of the container seal.

9. The system of claim 8, wherein the state of the container seal comprises at least one of: locked or unlocked.

10. The system of claim 8, wherein the state of the container seal comprises at least one of: tampered or untampered.

11. The system of claim 1, wherein the context of the container seal comprises one or more characteristics of the container seal.

12. The system of claim 1, wherein the context of the container seal comprises one or more locations of the container seal.

13. A non-transitory computer readable medium having instructions stored thereon that, when executed by a processor, cause the processor to
   receive one or more images;
   process the one or more images to identify one or more hooks and one or more handles of a container within at least one of the one or more images;
   based on an identification of the one or more hooks and the one or more handles within the one or more images, mark one or more areas of the one or more images as being likely to contain a container seal;
   process one or more templates associated with a seal type of the container seal to (a) detect one or more interest points within the one or more templates and (b) compute a numerical descriptor for each of the one or more interest points within the one or more templates;
   convert the one or more templates into one or more numeric vectors;
   process, by the processor, the one or more areas of the one or more images to generate one or more interest points of the one or more images;
   match, based on the one or more numeric vectors, the one or more interest points of the one or more images with the one or more interest points of one or more templates to determine an identification of the container seal, the identification of the container seal comprising the seal type of the container seal;
   process the one or more images to determine a context of the container seal and a location of the container seal in relation to the container;
   correlate the seal type of the container seal with (a) the context of the container seal and (b) the location of the container seal in relation to the container;
   determine, based on the correlation of the seal type of the container seal with the context of the container seal and the location of the container seal in relation to the container, an effectiveness of the container seal; and
   provide an identification of the container seal and an identification of the effectiveness of the container seal.

14. A method comprising:
   receiving an image;
   processing the image to identify one or more hooks and one or more handles of a container within the image;
   based on an identification of the one or more hooks and the one or more handles within the image, marking one or more areas of the image as being likely to contain a container seal;
   processing one or more templates associated with a seal type of the container seal to (a) detect one or more interest points within the one or more templates and (b)

compute a numerical descriptor for each of the one or more interest points within the one or more templates;

converting the one or more templates into one or more numeric vectors;

processing, by a processing device, the one or more areas of the image to generate one or more interest points of the image;

matching, based on the one or more numeric vectors, the one or more interest points of the image with the one or more interest points of one or more templates to determine the seal type of the container seal;

processing the image to determine a context of the container seal and a location of the container seal in relation to the container;

correlating the seal type of the container seal with (a) the context of the container seal and (b) the location of the container seal in relation to the container;

determining, based on the correlation of the seal type of the container seal with the context of the container seal and the location of the container seal in relation to the container, an effectiveness of the container seal; and providing, the effectiveness of the container seal.

15. The method of claim 14, wherein processing the one or more areas comprises processing the one or more areas to determine an identification of a state of the container seal.

16. A method comprising:

receiving one or more images;

processing the one or more images to identify one or more hooks and one or more handles of a container within the one or more images;

based on an identification of the one or more hooks and the one or more handles within the one or more images, marking one or more areas of the one or more images as being likely to contain a container seal;

processing one or more templates associated with a seal type of the container seal to (a) detect one or more interest points within the one or more templates and (b) compute a numerical descriptor for each of the one or more interest points within the one or more templates;

converting the one or more templates into one or more numeric vectors;

processing, by a processing device, the one or more areas of the one or more images to generate one or more interest points of the one or more images;

matching, based on the one or more numeric vectors, the one or more interest points of the one or more images with the one or more interest points of one or more templates to determine an identification of the container seal, the identification of the container seal comprising the seal type of the container seal;

processing the one or more images to determine a context of the container seal and a location of the container seal in relation to the container;

correlating the seal type of the container seal with (a) the context of the container seal and (b) the location of the container seal in relation to the container;

determining, based on the correlation of the seal type of the container seal with the context of the container seal and the location of the container seal in relation to the container, an effectiveness of the container seal; and providing the identification of the container seal and an identification of the effectiveness of the container seal.

* * * * *